US012277889B2

(12) United States Patent
Jang et al.

(10) Patent No.: US 12,277,889 B2
(45) Date of Patent: *Apr. 15, 2025

(54) DISPLAY DRIVER IC INCLUDING DITHERING CIRCUIT CAPABLE OF ADAPTIVELY CHANGING THRESHOLD GRAYSCALE VALUE DEPENDING ON DISPLAY BRIGHTNESS VALUE, DEVICE INCLUDING THE SAME, AND METHOD THEREOF

(71) Applicant: SAMSUNG ELECTRONICS CO., LTD., Suwon-si (KR)

(72) Inventors: Byoungyoon Jang, Gimhae-si (KR); Yong Hoon Yu, Suwon-si (KR); Se Whan Na, Seoul (KR); Jong-Hee Na, Hwaseong-si (KR); Hyeonsu Park, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/385,002

(22) Filed: Oct. 30, 2023

(65) Prior Publication Data

US 2024/0062698 A1 Feb. 22, 2024

Related U.S. Application Data

(63) Continuation of application No. 17/960,435, filed on Oct. 5, 2022, now Pat. No. 11,810,495.

(30) Foreign Application Priority Data

Feb. 17, 2022 (KR) ........................ 10-2022-0020896

(51) Int. Cl.
*G09G 3/20* (2006.01)

(52) U.S. Cl.
CPC ... *G09G 3/2044* (2013.01); *G09G 2320/0233* (2013.01); *G09G 2320/0626* (2013.01); *G09G 2360/145* (2013.01)

(58) Field of Classification Search
CPC ... G09G 2320/0233; G09G 2320/0285; G09G 2320/0626; G09G 2360/145; G09G 3/2044; G09G 3/3258; G09G 3/2022; G09G 5/06
See application file for complete search history.

(56) References Cited

U.S. PATENT DOCUMENTS 7,282,444 B2 10/2007 Tanida et al.
9,799,260 B2 10/2017 Song et al.
(Continued)

FOREIGN PATENT DOCUMENTS

JP 2005-167093 A 6/2005
KR 10-2282171 B1 7/2021

*Primary Examiner* — Richard J Hong
(74) *Attorney, Agent, or Firm* — Muir Patent Law, PLLC

(57) ABSTRACT

A display driver integrated circuit (IC) includes a data line driver that drives a first data line connected with a first pixel of a display in response to output image data, and a dithering circuit that receives a brightness value of the display, calculates a first reference grayscale value corresponding to the brightness value using a first group of threshold grayscale values, receives input image data with a first grayscale value, which corresponds to the first pixel, compares the first grayscale value and the first reference grayscale value, and generates the output image data having not the first grayscale value but an output grayscale value when the first grayscale value is smaller than the first reference grayscale value.

20 Claims, 13 Drawing Sheets

(56) References Cited

U.S. PATENT DOCUMENTS

| | | | | |
|---|---|---|---|---|
| 9,870,732 | B2 | 1/2018 | Park et al. | |
| 10,152,908 | B2 | 12/2018 | Pyeon et al. | |
| 10,475,368 | B2 | 11/2019 | Park et al. | |
| 10,600,359 | B2 | 3/2020 | Park et al. | |
| 2005/0088373 | A1 | 4/2005 | Lee | |
| 2005/0206588 | A1 * | 9/2005 | Min | G09G 3/2022 345/63 |
| 2007/0091042 | A1 | 4/2007 | Chung et al. | |
| 2016/0267876 | A1 * | 9/2016 | Kim | G09G 5/10 |
| 2017/0092189 | A1 | 3/2017 | Hwang | |
| 2017/0098407 | A1 * | 4/2017 | Jeong | G09G 3/3258 |
| 2017/0358255 | A1 | 12/2017 | Wang et al. | |
| 2018/0240437 | A1 * | 8/2018 | Miller | G09G 5/06 |
| 2021/0056886 | A1 | 2/2021 | Pahalawatta | |
| 2021/0375181 | A1 * | 12/2021 | Pyun | G09G 3/2077 |
| 2022/0101772 | A1 * | 3/2022 | Wetherell | G09G 3/2007 |
| 2022/0165201 | A1 * | 5/2022 | Park | G09G 3/2007 |
| 2023/0048619 | A1 | 2/2023 | Kim et al. | |
| 2023/0115938 | A1 | 4/2023 | Yeh et al. | |

* cited by examiner (a)

(b)

DISPLAY DRIVER IC INCLUDING DITHERING CIRCUIT CAPABLE OF ADAPTIVELY CHANGING THRESHOLD GRAYSCALE VALUE DEPENDING ON DISPLAY BRIGHTNESS VALUE, DEVICE INCLUDING THE SAME, AND METHOD THEREOF

CROSS-REFERENCE TO RELATED APPLICATIONS

This is a continuation application based on pending application Ser. No. 17/960,435, filed Oct. 5, 2022, the entire contents of which is hereby incorporated by reference.

This application claims priority under 35 U.S.C. § 119 to Korean Patent Application No. 10-2022-0020896 file Feb. 17, 2022, in the Korean Intellectual Property Office, the disclosures of which are incorporated by reference herein in their entireties.

BACKGROUND

1. Field

Embodiments relate to a dithering technology, and more particularly, relate to a display driver integrated circuit (IC) capable of adaptively changing a threshold grayscale value depending on a display brightness value, a device including the display driver IC, and a dithering method thereof.

2. Description of the Related Art

Various kinds of flat display devices have been developed. For example, the flat display devices include a liquid crystal display device, a field emission display device, a plasma display device, and an organic light emitting display device. The organic light emitting display device is lighter and thinner than the remaining display devices. Also, the organic light emitting display device is wider in field of view, faster in response time, and smaller in power consumption than the remaining display devices.

SUMMARY

An embodiment is directed to a display driver integrated circuit (IC), including a data line driver that drives a first data line connected with a first pixel of a display in response to output image data, and a dithering circuit that receives a brightness value of the display, calculates a first reference grayscale value corresponding to the brightness value using a first group of threshold grayscale values, receives input image data with a first grayscale value, which corresponds to the first pixel, compares the first grayscale value and the first reference grayscale value, and generates the output image data having not the first grayscale value but an output grayscale value when the first grayscale value is smaller than the first reference grayscale value. The dithering circuit selects one of the first group of threshold grayscale values as the output grayscale value.

The dithering circuit further calculates a second reference grayscale value corresponding to the brightness value using a first group of minimum grayscale values, further compares the first grayscale value and the second reference grayscale value, and selects one of the first group of threshold grayscale values and the first group of minimum grayscale values as the output grayscale value when the first grayscale value is greater than the second reference grayscale value and is smaller than the first reference grayscale value.

An embodiment is directed to a display device, including a display that includes a first data line connected with a first pixel, and a display driver IC that drives the first data line. The display driver IC includes a data line driver that drives the first data line in response to output image data, a reference grayscale value calculation circuit that receives a brightness value of the display and calculates a first reference grayscale value corresponding to the brightness value using a first group of threshold grayscale values, and a threshold grayscale value change circuit that receives input image data with a first grayscale value, which corresponds to the first pixel, compares the first grayscale value and the first reference grayscale value, changes the first grayscale value to an output grayscale value when the first grayscale value is smaller than the first reference grayscale value, and generates the output image data having the output grayscale value. The output grayscale value is one of the first group of threshold grayscale values.

An embodiment is directed to an operating method of a display driver IC for dithering, including receiving a brightness value of a display and calculating a first reference grayscale value corresponding to the brightness value using a first group of threshold grayscale values, receiving input image data having a first grayscale value and comparing the first grayscale value and the first reference grayscale value, changing the first grayscale value to an output grayscale value when the first grayscale value is smaller than the first reference grayscale value, and driving a first data line connected with a first pixel disposed in the display using output image data having the output grayscale value.

BRIEF DESCRIPTION OF THE DRAWINGS

Features will become apparent to those of skill in the art by describing in detail example embodiments with reference to the attached drawings in which.

DETAILED DESCRIPTION

A threshold grayscale value that is described in the specification means the lowest grayscale value at which the Mura does not appear in an image displayed in an organic light emitting diode display (OLED display) including organic light emitting diodes.

A grayscale value (alternatively referred to as a "grayscale level") indicates the brightness of a pixel. The grayscale value is also called a gray value. A minimum grayscale value is zero, and a maximum grayscale value depends on a digitization depth of an image. For example, in an 8-bit-depth image, the maximum grayscale value is 255.

Figure 8:
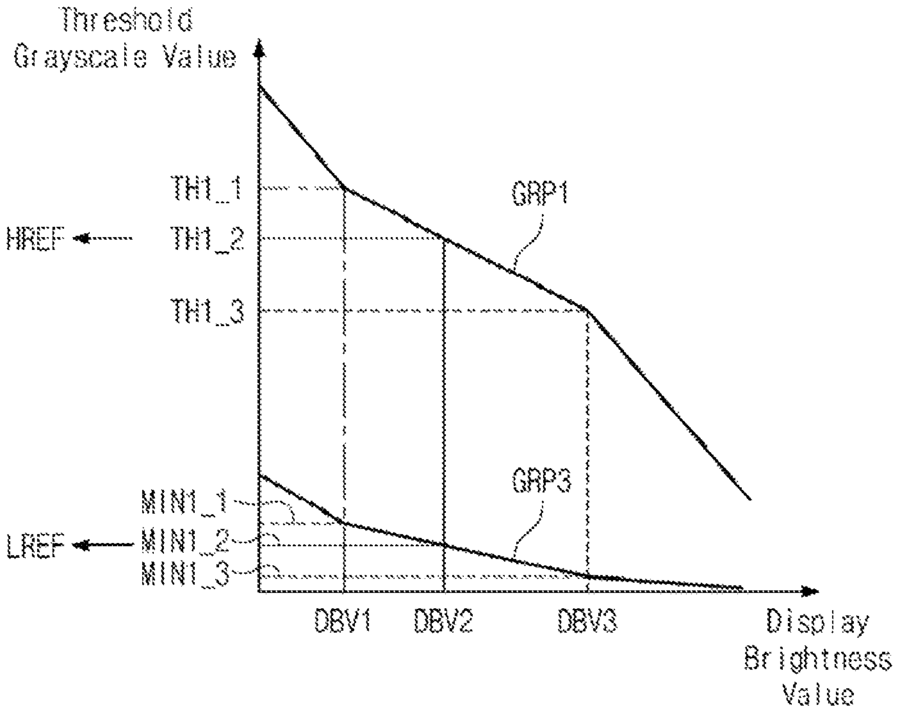
FIG. 8 is a diagram illustrating an example embodiment for describing a process in which a reference grayscale value calculation circuit illustrated in FIG. 7 decides a first reference grayscale value and a second reference grayscale value.
Figure 10:
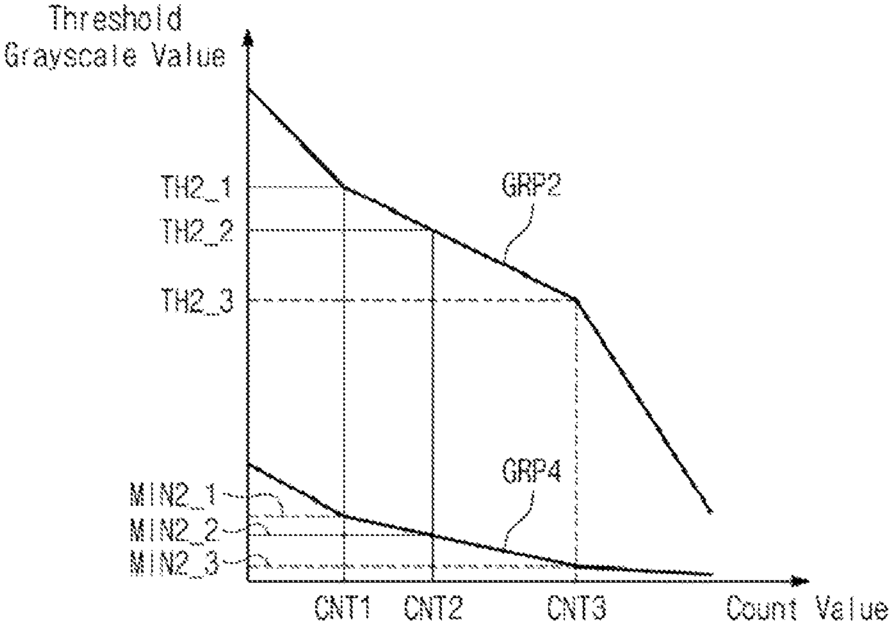
FIG. 10 is a diagram illustrating an example embodiment of a relationship between a count value and a threshold grayscale value for the purpose of describing an operation of a threshold grayscale value calculation circuit illustrated in FIG. 9.

Because each of minimum grayscale values MIN1_1 and MIN1_3 illustrated in FIG. 8 may change depending on a display brightness value, and each of minimum grayscale values MIN2_1, MIN2_2, and MIN2_3 illustrated in FIG. 10 may change depending on a count value, the corresponding minimum grayscale values MIN1_1, MIN1_3, MIN2_1, MIN2_2, and MIN2_3 may not be zero.

In the specification, it is assumed that a low grayscale level (or a low-grayscale image) is 0.8 nit (0.8 $cd/m^2$), but the low grayscale level is not limited to 0.8 nit.

Because a driving current of each of pixels disposed in a display 300 decreases when a display brightness value decreases, a dithering circuit 210 according to an example embodiment increases a threshold grayscale value at which the Mura does not appear in the low-grayscale image displayed in the display 300.

Figure 1:
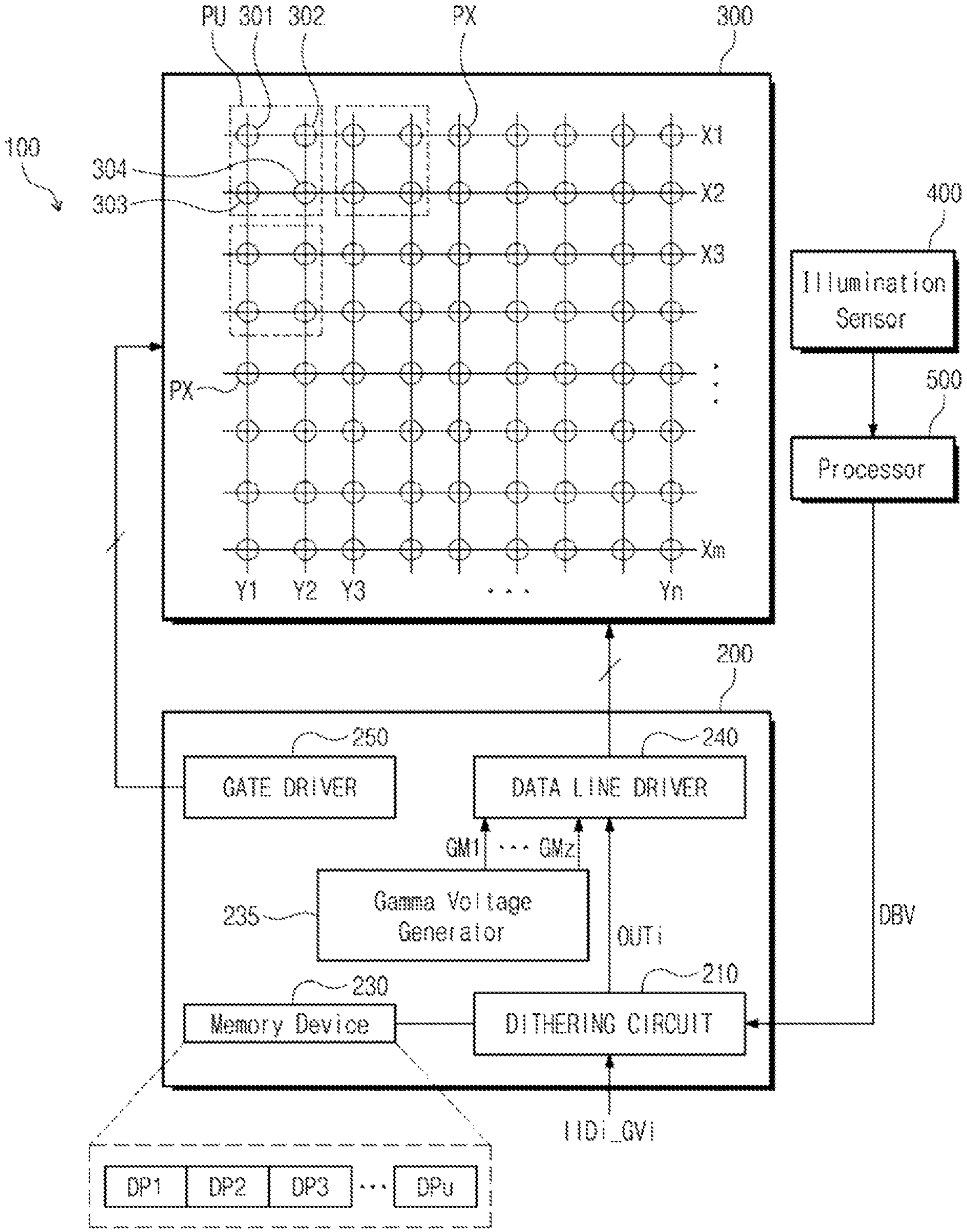
FIG. 1 is a block diagram of a display device including a dithering circuit according to an example embodiment.

FIG. 1 is a block diagram of a display device including a dithering circuit according to an example embodiment.

Referring to FIG. 1, a display device 100 may include a display driver integrated circuit (IC) 200, the display 300 (also referred to as a "display panel"), an illumination sensor 400, and a processor 500.

The display device 100 may be a television (TV) or a mobile device. Examples of the mobile device include a smartphone, a laptop computer, a mobile Internet device (MID), and/or a wearable computer. As described in detail below, the display device 100 may improve, i.e., reduce, display artifacts such as Mura, e.g., Mura that appears in a low-grayscale image.

The display driver IC 200 may perform a dithering operation of adaptively (or automatically) changing a threshold grayscale value depending on a brightness value DBV of the display 300, an operation of driving a plurality of data lines Y1 to Yn (n being a natural number of 4 or more) included in the display 300, and an operation of driving a plurality of gate lines X1 to Xm (m being a natural number of 4 or more). For example, the brightness value DBV of the display 300 may be expressed by a digital code including a plurality of bits.

The display driver IC 200 may include a dithering circuit 210, a memory device 230, a gamma voltage generator 235, a data line driver (alternatively referred to as a "source driver") 240, and a gate driver 250.

An operation of the dithering circuit 210 will be described in detail with reference to FIGS. 2 to 13.

The memory device 230 may store a plurality of dither patterns DP1 to DPu (u being a natural number of 4 or more). A dither pattern may be referred to as a dither mask.

Each of the dither patterns DP1 to DPu may be matched with or mapped onto each of different grayscale values.

The memory device 230 may be a static random access memory (SRAM).

The gamma voltage generator 235 may generate a plurality of gamma voltages GM1 to GMz (z being a natural number of 2 or more) and output the gamma voltages GM1 to GMz to the data line driver 240.

The data line driver 240 may select a corresponding gamma voltage of the plurality of gamma voltages GM1 to GMz in response to output image data OUTi (i being a natural number of 2 or more) having a specific grayscale value (e.g., a specific threshold grayscale value or a specific minimum grayscale value) output from the dithering circuit 210, and output a driving voltage corresponding to the selected corresponding gamma voltage to a corresponding data line of the plurality of data lines (also referred to as "source lines") Y1 to Yn included in the display 300.

The gate driver 250 may sequentially generate gate signals for driving the plurality of gate lines X1 to Xm included in the display 300.

For convenience of description, one data line driver 240 and one gate driver 250 are illustrated in FIG. 1. However, depending on embodiments, the data line driver 240 collectively indicates a plurality of data line drivers, and the gate driver 250 collectively indicates a plurality of gate drivers. Also, the display driver IC 200 is illustrated in FIG. 1 as including both the data line driver 240 and the gate driver 250. However, depending on embodiments, the gate driver 250 may be disposed outside the display driver IC 200.

The display 300 may include the plurality of data lines Y1 to Yn, the plurality of gate lines X1 to Xm, and a plurality of pixels PX arranged in a matrix form. Respective ones of the plurality of pixels PX may be connected with one of the plurality of data lines Y1 to Yn and one of the plurality of gate lines X1 to Xm.

The display 300 may be a display including organic light emitting diodes or a display including liquid crystals.

The illumination sensor 400 may be disposed inside or outside the display 300. The illumination sensor 400 may sense the brightness (or the whole brightness) of the display 300 to generate a sensing signal, and may output the sensing signal to the processor 500. The processor 500 may process the sensing signal to generate the display brightness value DBV corresponding to the brightness (or the whole brightness) of the display 300.

For example, to adjust the brightness of the display 300, the display driver IC 200 may perform a dimming operation on the display 300 using gamma voltages generated by the gamma voltage generator 235. The illumination sensor 400 may generate a sensing signal by sensing the brightness (or the whole brightness) of the display 300 adjusted depending on the dimming operation, and the processor 500 may generate the display brightness value DBV corresponding to a result of the dimming operation for the display 300 depending on the sensing signal.

The dimming may mean an operation of adjusting brightness of a light emitted from a diode included in a pixel PX, and the brightness of the light that is emitted from the diode may be adjusted by a gamma voltage corresponding to the diode.

When the display device 100 is a smartphone, the processor 500 may be an application processor (AP), and a user of the smartphone may adjust the screen brightness of the smartphone using an automatic function or manually.

Figure 2:
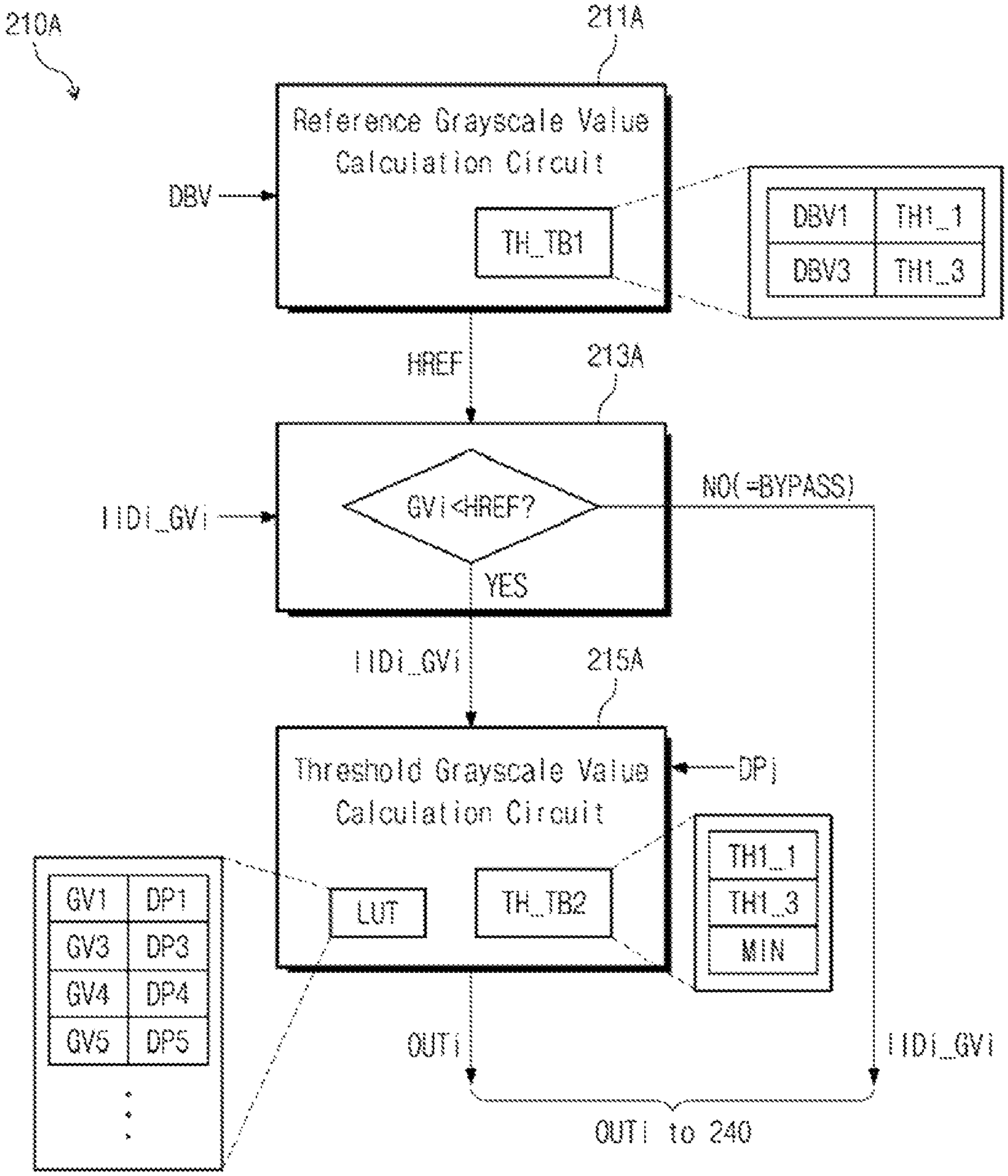
FIG. 2 is a block diagram illustrating an example embodiment of a dithering circuit illustrated in FIG. 1.
Figure 3:
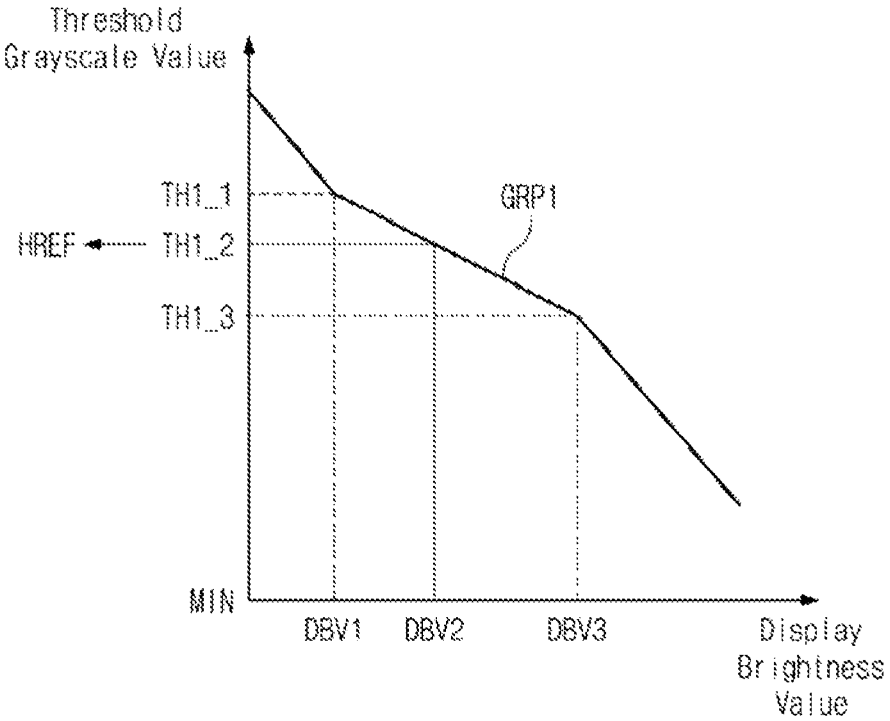
FIG. 3 is a diagram illustrating an example embodiment for describing a process in which a reference grayscale value calculation circuit illustrated in FIG. 2 decides a first reference grayscale value.

FIG. 2 is a block diagram illustrating an example embodiment of a dithering circuit illustrated in FIG. 1, and FIG. 3 is a diagram illustrating an example embodiment for describing a process in which a reference grayscale value calculation circuit illustrated in FIG. 2 decides a first reference grayscale value.

Referring to FIG. 2, a dithering circuit 210A may include a reference grayscale value calculation circuit 211A, a comparing circuit 213A, and a threshold grayscale value calculation circuit 215A. The dithering circuit 210A of FIG. 2 is an example of the dithering circuit 210 illustrated in FIG. 1.

As described in connection with FIG. 2 and additional figures discussed below, a threshold grayscale value change circuit may be implemented to include a comparing circuit 213A or 213B and a threshold grayscale value calculation circuit 215A, 215B, 215C, 215D, or 215E.

Referring to the comparing circuit 213A and the threshold grayscale value calculation circuit 215A in FIG. 2, a threshold grayscale value change circuit that includes the comparing circuit 213A and the threshold grayscale value calculation circuit 215A may receive first input image data IID1 having a first grayscale value GV1 corresponding to a first pixel 301 (refer to FIG. 1), compare the first grayscale value GV1 and a first reference grayscale value HREF, change the first grayscale value GV1 to an output grayscale value when the first grayscale value GV1 is smaller than the first reference grayscale value HREF, and generate first output image data OUT1 having the output grayscale value. The output grayscale value may be one of a first group of threshold grayscale values TH1_1 and TH1_3.

The reference grayscale value calculation circuit 211A may include a memory device that stores first information TH_TB1 including the first group of threshold grayscale values TH1_1 and TH1_3 associated with display brightness values DBV1 and DBV3. The reference grayscale value calculation circuit 211A may receive the display brightness value DBV indicating the brightness of the display 300 (or the whole brightness of the display 300) from the processor 500 and calculate the first reference grayscale value HREF corresponding to the display brightness value DBV using the first information TH_TB1.

Each of information TH_TB1 to TH_TB6 to be described in the specification may be stored in the form of a table, and may be input (or set) from (or by) the outside.

FIG. 3 shows a relationship between the display brightness value DBV and a threshold grayscale value.

Referring to FIG. 3, when the display brightness value DBV decreases, a threshold grayscale value at which the Mura does not appear in a low-grayscale image increases. For example, as the display brightness value DBV changes, a gamma voltage changes.

Referring to FIG. 3, assuming that when the display brightness value DBV is the first brightness value DBV1, the threshold grayscale value is the first threshold grayscale value TH1_1 and when the display brightness value DBV is the third brightness value DBV3, the threshold grayscale value is the third threshold grayscale value TH1_3, the reference grayscale value calculation circuit 211A calculates a second threshold grayscale value TH1_2 for the second brightness value DBV2 using the already known values DBV1, DBV3, TH1_1, and TH1_3, and outputs the second threshold grayscale value TH1_2 to the comparing circuit 213A as the first reference grayscale value HREF.

For example, the reference grayscale value calculation circuit 211A may calculate the second threshold grayscale value TH1_2 for the second brightness value DBV2 by interpolating the first threshold grayscale value TH1_1 for the first brightness value DBV1 and the third threshold grayscale value TH1_3 for the third brightness value DBV3. For example, the reference grayscale value calculation circuit 211A may calculate the second threshold grayscale value TH1_2 for the second brightness value DBV2 using a first graph GRP1 of a straight line passing two points (DBV1, TH1_1) and (DBV3, TH1_3).

The comparing circuit 213A receives input image data IIDi having a grayscale value GVi, compares the grayscale value GVi and the first reference grayscale value HREF, and outputs (or bypasses) the input image data IIDi having the grayscale value GVi to the data line driver 240 as the output image data OUTi when the grayscale value GVi is equal to or greater than the first reference grayscale value HREF.

However, when the grayscale value GVi is smaller than the first reference grayscale value HREF, the comparing circuit 213A outputs the input image data IIDi having the grayscale value GVi to the threshold grayscale value calculation circuit 215A.

Figure 4:
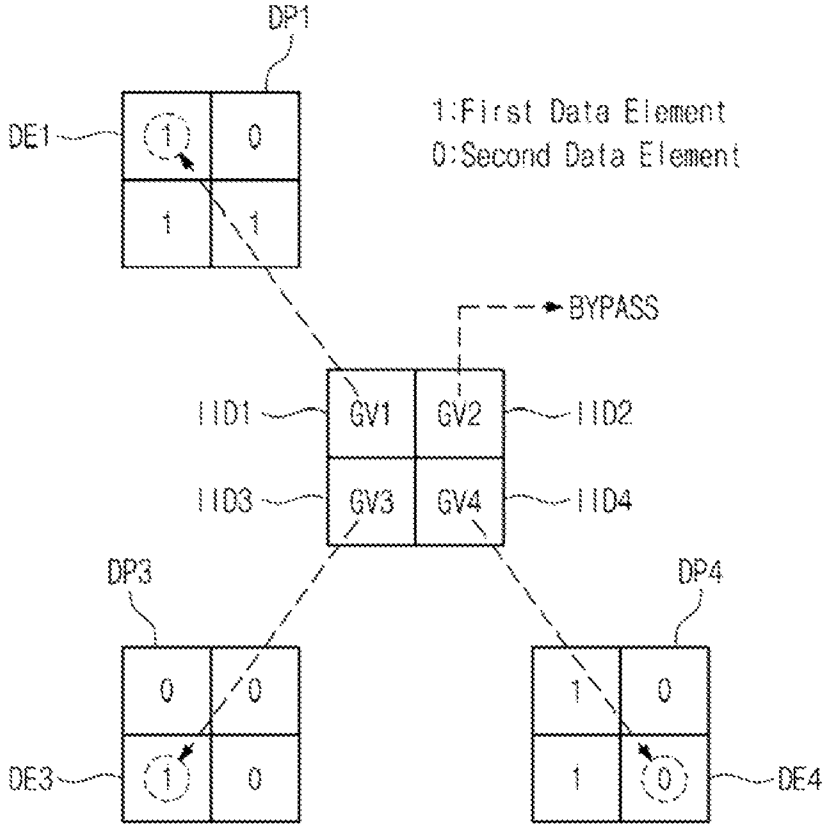
FIG. 4 is a diagram illustrating an example embodiment of input image data and output image data for describing an operation of a dithering circuit illustrated in FIG. 1.
Figure 4:
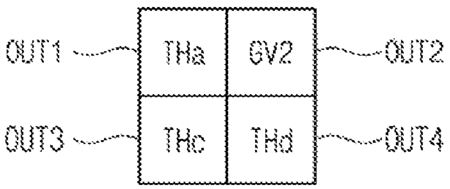

FIG. 4 is a diagram illustrating an example embodiment of input image data and output image data for describing an operation of a dithering circuit illustrated in FIG. 4.

Referring to FIGS. 1 and 4, it is assumed that first input image data IID1 having a first grayscale value GVi (i=1) corresponds to the first pixel 301, second input image data IID2 having a second grayscale value GVi (i=2) corresponds to a second pixel 302 (refer to FIG. 1), third input image data IID3 having a third grayscale value GVi (i=3) corresponds to a third pixel 303 (refer to FIG. 1), fourth input image data IID4 having a fourth grayscale value GVi (i=4) corresponds to a fourth pixel 304 (refer to FIG. 1), each of the grayscale values GV1, GV3, and GV4 is smaller than the first reference grayscale value HREF, and the second grayscale value GV2 is equal to or greater than the first reference grayscale value HREF.

In FIG. 4, 2*2 input image data IID1 to IID4 are some of input image data of one frame, and 2*2 output image data OUT1 to OUT4 are some of output image data of one frame.

Because the first grayscale value GV1 is smaller than the first reference grayscale value HREF, the comparing circuit 213A sends the first input image data IID1 having the first grayscale value GV1 to the threshold grayscale value calculation circuit 215A.

The threshold grayscale value calculation circuit 215A may obtain (also referred to as "read") a first dither pattern DPj (j=1, 1≤j≤u) corresponding to the first grayscale value GV1 from the memory device 230 with reference to a lookup table LUT stored therein (as described above, the memory device 230 may store a plurality of dither patterns DP1 to DPu (u being a natural number of 4 or more)).

When a processing unit PU illustrated in FIG. 1 includes 2*2 pixels 301, 302, 303, and 304, each of dither patterns DP1, DP3, and DP4 illustrated in FIG. 4 is a 2*2 data matrix.

Each of the dither patterns DP1, DP3, and DP4 includes at least one first data element having a first value and at least one second data element having a second value. Although an example in which the first value is expressed by logic 1 (or data 1) or the second value is expressed by logic 0 (or data 0) is illustrated in FIG. 4, the first value and the second value may be expressed in various manners.

The first data element is referred to as an “on pixel”, and the second data element is referred to as an “off pixel”. The first data element indicates a change of a specific grayscale value GVi to one of threshold grayscale values, and the second data element indicates a change of the specific grayscale value GVi to a minimum grayscale value.

Referring to example (a) in the upper portion of FIG. 4, the first dither pattern DP1 includes three first data elements and one second data element, the third dither pattern DP3 includes one first data element and three second data elements, and the fourth dither pattern DP4 includes two first data elements and two second data elements.

According to an example embodiment, when the processing unit PU includes K*K pixels, each of the dither patterns DP1 to DPu stored in the memory device 230 is a K*K data element matrix. In an example embodiment, K is a natural number of 2 or more. In an example embodiment, when each of the dither patterns DP1 to DPu is the K*K dither pattern, the number of data elements is $K^2$.

The threshold grayscale value calculation circuit 215A may select (also referred to as “extract”) a first data element DE1 (=1), the location of which is the same as a location (e.g., the upper left) of the first input image data IID1 corresponding to the first pixel 301, from the first dither pattern DP1.

The threshold grayscale value calculation circuit 215A may include a memory device that stores second information TH_TB2 including grayscale values TH1_1, TH1_3, and MIN. The lookup table LUT may be stored in the memory device of the threshold grayscale value calculation circuit 215A.

As the first data element DE1 (=1) matched with the first grayscale value GV1 is selected from the first dither pattern DP1, the threshold grayscale value calculation circuit 215A selects one of the first group of threshold grayscale values TH1_1 and TH1_3 included in the second information TH_TB2, generates the first output image data OUT1 having the selected threshold grayscale value TH1_1 or TH1_3, and outputs the first output image data OUT1 to the data line driver 240.

The data line driver 240 selects a gamma voltage corresponding to the threshold grayscale value TH1_1 or TH1_3 from among the gamma voltages GM1 to GMz and supplies the selected gamma voltage as a first driving voltage to the first data line Y1 connected with the first pixel 301, and the gate driver 250 generates a first gate signal for driving the first gate line X1.

Depending on the first driving voltage and the first gate signal, the first pixel 301 displays an image corresponding to the first output image data OUT1 having the threshold grayscale value TH1_1 or TH1_3.

Referring to example (b) in the lower portion of FIG. 4, because the second grayscale value GV2 is greater than the first reference grayscale value HREF, the comparing circuit 213A outputs (or bypasses) the second input image data IID2 having the second grayscale value GV2 to the data line driver 240 as the second output image data OUT2.

The data line driver 240 selects a gamma voltage corresponding to the second grayscale value GV2 from among the gamma voltages GM1 to GMz and supplies the selected gamma voltage as a second driving voltage to the second data line Y2 connected with the second pixel 302, and the gate driver 250 generates the first gate signal for driving the first gate line X1.

Depending on the second driving voltage and the first gate signal, the second pixel 302 displays an image corresponding to the second output image data OUT2 having the second grayscale value GV2.

Referring again to example (a) in the upper portion of FIG. 4, because the third grayscale value GV3 is smaller than the first reference grayscale value HREF, the comparing circuit 213A sends the third input image data IID3 having the third grayscale value GV3 to the threshold grayscale value calculation circuit 215A.

The threshold grayscale value calculation circuit 215A may obtain a third dither pattern DPj (j=3) corresponding to the third grayscale value GV3 from the memory device 230 with reference to the lookup table LUT stored therein.

The threshold grayscale value calculation circuit 215A selects first data element DE3 (=1), the location of which is the same as a location (e.g., the lower left) of the third input image data IID3 corresponding to the third pixel 303, from the third dither pattern DP3.

As the first data element DE3 (=1) associated with the third grayscale value GV3 is selected from the third dither pattern DP3, the threshold grayscale value calculation circuit 215A selects one of the first group of threshold grayscale values TH1_1 and TH1_3 included in the second information TH_TB2, generates the third output image data OUT3 having the selected threshold grayscale value TH1_1 or TH1_3, and outputs the third output image data OUT3 to the data line driver 240.

The data line driver 240 selects a gamma voltage corresponding to the threshold grayscale value TH1_1 or TH1_3 from among the gamma voltages GM1 to GMz and supplies the selected gamma voltage as a third driving voltage to the first data line Y1 connected with the third pixel 303, and the gate driver 250 generates a second gate signal for driving the second gate line X2.

Depending on the third driving voltage and the second gate signal, the third pixel 303 displays an image corresponding to the third output image data OUT3 having the threshold grayscale value TH1_1 or TH1_3.

Referring again to example (a) in the upper portion of FIG. 4, because the fourth grayscale value GV4 is smaller than the first reference grayscale value HREF, the comparing circuit 213A sends the fourth input image data IID4 having the fourth grayscale value GV4 to the threshold grayscale value calculation circuit 215A.

The threshold grayscale value calculation circuit 215A may obtain a fourth dither pattern DPj (j=4) corresponding to the fourth grayscale value GV4 from the memory device 230 with reference to the lookup table LUT stored therein.

The threshold grayscale value calculation circuit 215A selects second data element DE4 (=0), the location of which is the same as a location (e.g., the lower right) of the fourth input image data IID4 corresponding to the fourth pixel 304, from the fourth dither pattern DP4.

As the second data element DE4 (=0) associated with the fourth grayscale value GV4 is selected from the fourth dither pattern DP4, the threshold grayscale value calculation circuit 215A selects the minimum grayscale value MIN included in the second information TH_TB2, generates the fourth output image data OUT4 having the selected minimum grayscale value MIN, and outputs the fourth output image data OUT4 to the data line driver 240. For example, the minimum grayscale value MIN may be “0” (zero).

The data line driver 240 selects a gamma voltage corresponding to the minimum grayscale value MIN from among the gamma voltages GM1 to GMz and supplies the selected gamma voltage as a fourth driving voltage to the second data line Y2 connected with the fourth pixel 304, and the gate driver 250 generates the second gate signal for driving the second gate line X2.

Depending on the fourth driving voltage and the second gate signal, the fourth pixel 304 displays an image corresponding to the fourth output image data OUT4 having the minimum grayscale value MIN.

Referring again to example (b) in the lower portion of FIG. 4, a grayscale value THa of the first output image data OUT1 is the first threshold grayscale value TH1_1 or the third threshold grayscale value TH1_3, a grayscale value THc of the third output image data OUT3 is the first threshold grayscale value TH1_1 or the third threshold grayscale value TH1_3, and a grayscale value THd of the fourth output image data OUT4 is the minimum grayscale value MIN.

Figure 5:
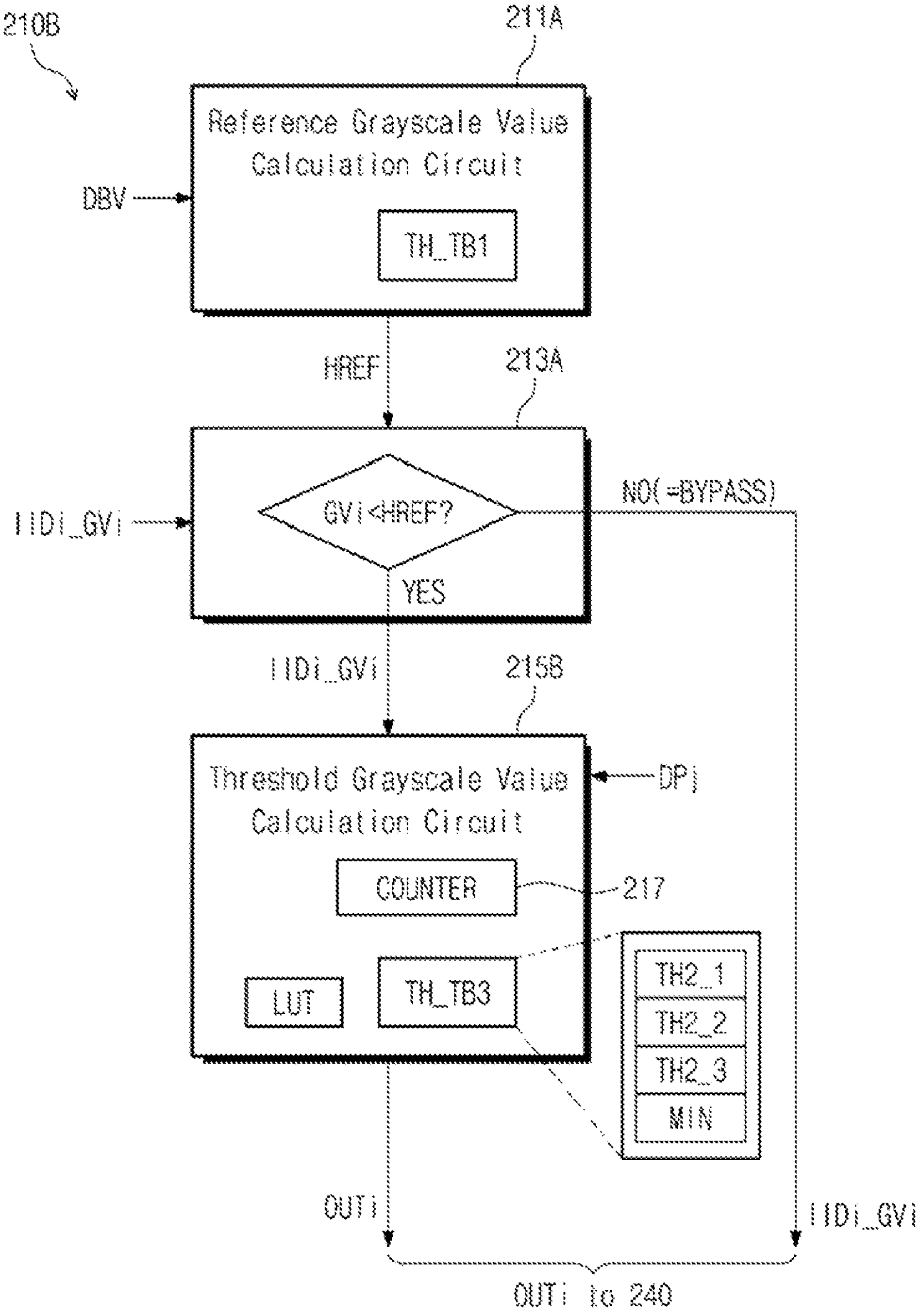
FIG. 5 is a block diagram illustrating an example embodiment of a dithering circuit illustrated in FIG. 1.
Figure 6:
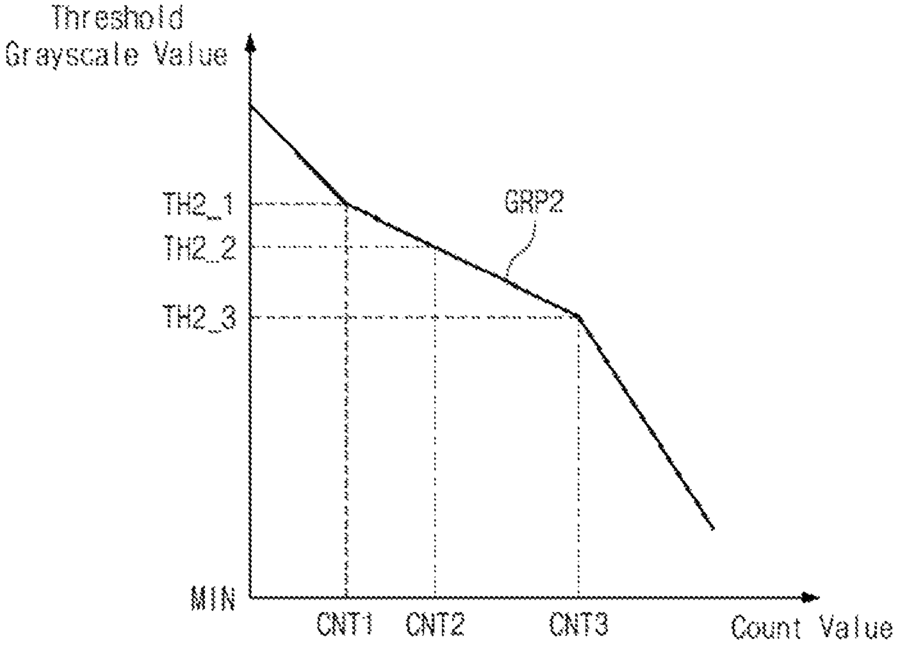
FIG. 6 is a diagram illustrating an example embodiment of a relationship between a count value and a threshold grayscale value for the purpose of describing an operation of a threshold grayscale value calculation circuit illustrated in FIG. 5.

FIG. 5 is a block diagram illustrating an example embodiment of a dithering circuit illustrated in FIG. 1, and FIG. 6 is a diagram illustrating an example embodiment of a relationship between a count value and a threshold grayscale value for the purpose of describing an operation of a threshold grayscale value calculation circuit illustrated in FIG. 5.

Referring to FIG. 5, a dithering circuit 210B may include the reference grayscale value calculation circuit 211A, the comparing circuit 213A, and a threshold grayscale value calculation circuit 215B. The dithering circuit 210B of FIG. 5 is an example of the dithering circuit 210 illustrated in FIG. 1.

Structures and operations of the reference grayscale value calculation circuit 211A and the comparing circuit 213A of FIG. 5 are the same as those of the reference grayscale value calculation circuit 211A and the comparing circuit 213A previously described in connection with FIG. 2.

Referring to FIGS. 2 and 5, the threshold grayscale value calculation circuit 215B of FIG. 5 generates a count value CNT as a result of counting the number of first data elements included in each of the dither patterns DP1, DP3, and DP4 using a counter 217, and selects one of a second group of threshold grayscale levels TH2_1, TH2_2, and TH2_3 using the count value CNT. For example, the count value CNT of each of the dither patterns DP1 to DPu may be 0, 1, 2, or 3.

For example, the threshold grayscale value calculation circuit 215B may calculate the threshold grayscale value TH2_2 for a second count value CNT2 using a second graph GRP2 defined depending on the threshold grayscale value TH2_1 for a first count value CNT1 and the threshold grayscale value TH2_3 for a third count value CNT3.

The threshold grayscale value calculation circuit 215B may include a memory device that stores third information TH_TB3 including grayscale values TH21, TH2_2, TH23, and MIN. Information stored in the lookup table LUT of the threshold grayscale value calculation circuit 215B is the same as the information stored in the lookup table LUT of the threshold grayscale value calculation circuit 215A.

When the first grayscale value GV1 is smaller than the first reference grayscale value HREF, the threshold grayscale value calculation circuit 215B obtains the first dither pattern DP1 corresponding to the first grayscale value GV1 from the memory device 230 and generates the count value CNT by counting the number of first data elements included in the first dither pattern DP1. For example, the count value CNT for the first dither pattern DP1 is 3.

When the count value CNT associated with the number of first data elements (e.g., logic 1's) included in a corresponding dither pattern is a first count value CNT1, the threshold grayscale value calculation circuit 215B calculates the fourth threshold grayscale value TH2_1; when the count value CNT associated with the number of first data elements included in the corresponding dither pattern is a second count value CNT2, the threshold grayscale value calculation circuit 215B calculates the fifth threshold grayscale value TH2_2; when the count value CNT associated with the number of first data elements included in the corresponding dither pattern is a third count value CNT3, the threshold grayscale value calculation circuit 215B calculates the sixth threshold grayscale value TH2_3.

The threshold grayscale value calculation circuit 215B calculates the threshold grayscale value TH2_3 corresponding to the count value CNT (e.g., CNT3) associated with the number of first data elements included in the first dither pattern DP1, generates the first output image data OUT1 having the threshold grayscale value TH2_3, and outputs the first output image data OUT1 to the data line driver 240.

When the third grayscale value GV3 is smaller than the first reference grayscale value HREF, the threshold grayscale value calculation circuit 215B obtains the third dither pattern DP3 corresponding to the third grayscale value GV3 from the memory device 230 and generates the count value CNT (e.g., CNT1) by counting the number of first data elements included in the third dither pattern DP3.

The threshold grayscale value calculation circuit 215B calculates the threshold grayscale value TH2_1 corresponding to the count value CNT (e.g., CNT1) associated with the number of first data elements included in the third dither pattern DP3, generates the third output image data OUT3 having the threshold grayscale value TH2_1, and outputs the third output image data OUT3 to the data line driver 240.

When the fourth grayscale value GV4 is smaller than the first reference grayscale value HREF, the threshold grayscale value calculation circuit 215B obtains the fourth dither pattern DP4 corresponding to the fourth grayscale value GV4 from the memory device 230 and generates the count value CNT (e.g., CNT2) by counting the number of first data elements included in the fourth dither pattern DP4.

However, as the second data element DE4 (=0) associated with the fourth grayscale value GV4 is selected from the fourth dither pattern DP4, the threshold grayscale value calculation circuit 215B generates the fourth output image data OUT4 having the minimum grayscale value MIN instead of the fifth threshold grayscale value TH2_2, and outputs the fourth output image data OUT4 to the data line driver 240.

Referring to FIGS. 4 to 6, in example (b) in the lower portion of FIG. 4, the grayscale value THa of the first output image data OUT1 is the sixth threshold grayscale value TH2_3, the grayscale value THc of the third output image data OUT3 is the fourth threshold grayscale value TH2_1, and the grayscale value THd of the fourth output image data OUT4 is the minimum grayscale value MIN.

Figure 7:
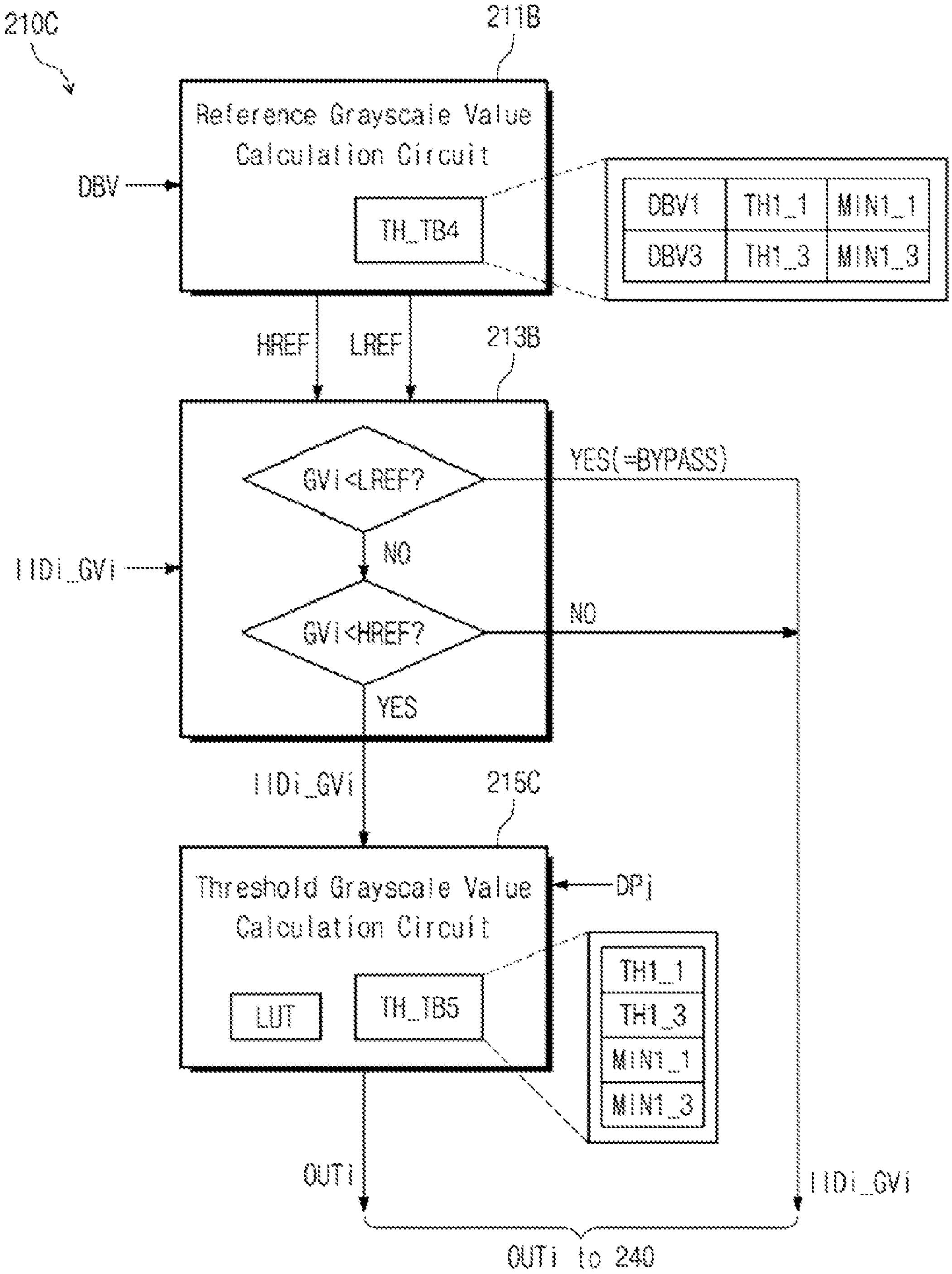
FIG. 7 is a block diagram illustrating an example embodiment of a dithering circuit illustrated in FIG. 1.

FIG. 7 is a block diagram illustrating an example embodiment of a dithering circuit illustrated in FIG. 1, and FIG. 8 is a diagram illustrating an example embodiment for describing a process in which a reference grayscale value calculation circuit illustrated in FIG. 7 decides a first reference grayscale value and a second reference grayscale value.

Referring to FIG. 7, a dithering circuit 210C may include a reference grayscale value calculation circuit 211B, a comparing circuit 213B, and a threshold grayscale value calculation circuit 215C. The dithering circuit 210C of FIG. 7 is an example of the dithering circuit 210 illustrated in FIG. 1.

The reference grayscale value calculation circuit 211B may include a memory device that stores fourth information TH_TB4 including the first group of threshold grayscale values TH1_1 and TH1_3 associated with the display brightness values DBV1 and DBV3 and a first group of minimum grayscale values MIN1_1 and MIN1_3.

Referring to an example illustrated in FIG. 8, assuming that when the display brightness value DBV is the first brightness value DBV1, a threshold grayscale value is the first threshold grayscale value TH1_1 and a minimum grayscale value is the first minimum grayscale value MIN1_1 and that when the display brightness value DBV is the third brightness value DBV3, a threshold grayscale value is the third threshold grayscale value TH1_3 and a minimum grayscale value is the third minimum grayscale value MIN1_3, the reference grayscale value calculation circuit 211B calculates the second threshold grayscale value TH1_2 for the second brightness value DBV2 using the already known values DBV1, DBV3, TH1_1, and TH1_3, calculates the second minimum grayscale value MIN1_2 for the second brightness value DBV2 using the already known values DBV1, DBV3, TH1_1, and TH1_3, outputs the second threshold grayscale value TH1_2 as the first reference grayscale value HREF to the comparing circuit 213B, and outputs the second minimum grayscale value MIN1_2 as a second reference grayscale value LREF to the comparing circuit 213B.

For example, the reference grayscale value calculation circuit 211B may calculate the second minimum grayscale value MIN1_2 for the second brightness value DBV2 by interpolating the first minimum grayscale value MIN1_1 for the first brightness value DBV and the third minimum grayscale value MIN1_3 for the third brightness value DBV3. For example, the reference grayscale value calculation circuit 211B may calculate the second minimum grayscale value MIN1_2 for the second brightness value DBV2 using a third graph GRP3 of a straight line passing two points (DBV1, MIN1_1) and (DBV3, MIN1_3).

Referring to the first graph GRP1 and the third graph GRP3 of FIG. 8, when the display brightness value DBV decreases, a threshold grayscale value at which the Mura does not appear at a low-grayscale image increases, and a minimum grayscale value increases.

The comparing circuit 213B receives the input image data IIDi having a specific grayscale value GVi, compares the specific grayscale value GVi and the second reference grayscale value LREF, compares the specific grayscale value GVi and the first reference grayscale value HREF, and outputs the input image data IIDi having the specific grayscale value GVi to the threshold grayscale value calculation circuit 215C only when the specific grayscale value GVi is equal to or greater than the second reference grayscale value LREF and is smaller than the first reference grayscale value HREF.

However, when the specific grayscale value GVi is smaller than the second reference grayscale value LREF or is equal to or greater than the first reference grayscale value HREF, the comparing circuit 213B immediately outputs (or bypasses) the input image data IIDi having the specific grayscale value GVi to the data line driver 240.

It is assumed that each of the grayscale values GV1, GV3, and GV4 is greater than the second reference grayscale value LREF and is smaller than the first reference grayscale value HREF, and the second grayscale value GV2 is greater than the first reference grayscale value HREF.

Because the first grayscale value GV1 is greater than the second reference grayscale value LREF and is smaller than the first reference grayscale value HREF (i.e., because LREF<GV1<HREF), the comparing circuit 213B sends the first input image data IID1 having the first grayscale value GV1 to the threshold grayscale value calculation circuit 215C.

The threshold grayscale value calculation circuit 215C obtains the first dither pattern DP1 corresponding to the first grayscale value GV1 from the memory device 230 with reference to the lookup table LUT stored therein. The threshold grayscale value calculation circuit 215C includes a memory device that stores fifth information TH_TB5 including the first group of threshold grayscale values TH1_1 and TH1_3 and the first group of minimum grayscale values MIN1_1 and MIN1_3.

As the first data element DE1 (=1) associated with the first grayscale value GV1 is selected from the first dither pattern DP1, the threshold grayscale value calculation circuit 215C selects one of the first group of threshold grayscale values TH1_1 and TH13, generates the first output image data OUT1 having the selected threshold grayscale value TH1_1 or TH1_3, and outputs the first output image data OUT1 to the data line driver 240.

Because the second grayscale value GV2 is greater than the first reference grayscale value HREF, the comparing circuit 213B passes the second input image data IID2 having the second grayscale value GV2 to the data line driver 240.

Because the third grayscale value GV3 is greater than the second reference grayscale value LREF and is smaller than the first reference grayscale value HREF (i.e., because LREF<GV3<HREF), the comparing circuit 213B sends the third input image data IID3 having the third grayscale value GV3 to the threshold grayscale value calculation circuit 215C.

The threshold grayscale value calculation circuit 215C obtains the third dither pattern DP3 corresponding to the third grayscale value GV3 from the memory device 230 with reference to the lookup table LUT stored therein.

As the first data element DE3 (=1) associated with the third grayscale value GV3 is selected from the third dither pattern DP3, the threshold grayscale value calculation circuit 215C selects one of the first group of threshold grayscale values TH1_1 and TH1_3, generates the third output image data OUT3 having the selected threshold grayscale value TH1_1 or TH1_3, and outputs the third output image data OUT3 to the data line driver 240.

Because the fourth grayscale value GV4 is greater than the second reference grayscale value LREF and is smaller than the first reference grayscale value HREF (i.e., because LREF<GV4<HREF), the comparing circuit 213B sends the fourth input image data IID4 having the fourth grayscale value GV4 to the threshold grayscale value calculation circuit 215C.

The threshold grayscale value calculation circuit 215C obtains the fourth dither pattern DP4 corresponding to the fourth grayscale value GV4 from the memory device 230 with reference to the lookup table LUT stored therein.

As the second data element DE4 (=0) associated with the fourth grayscale value GV4 is selected from the fourth dither pattern DP4, the threshold grayscale value calculation circuit 215C selects one of the first group of minimum grayscale values MIN1_1 and MIN1_3, generates the fourth output image data OUT4 having the selected minimum grayscale value MIN1_1 or MIN1_3, and outputs the fourth output image data OUT4 to the data line driver 240.

Figure 9:
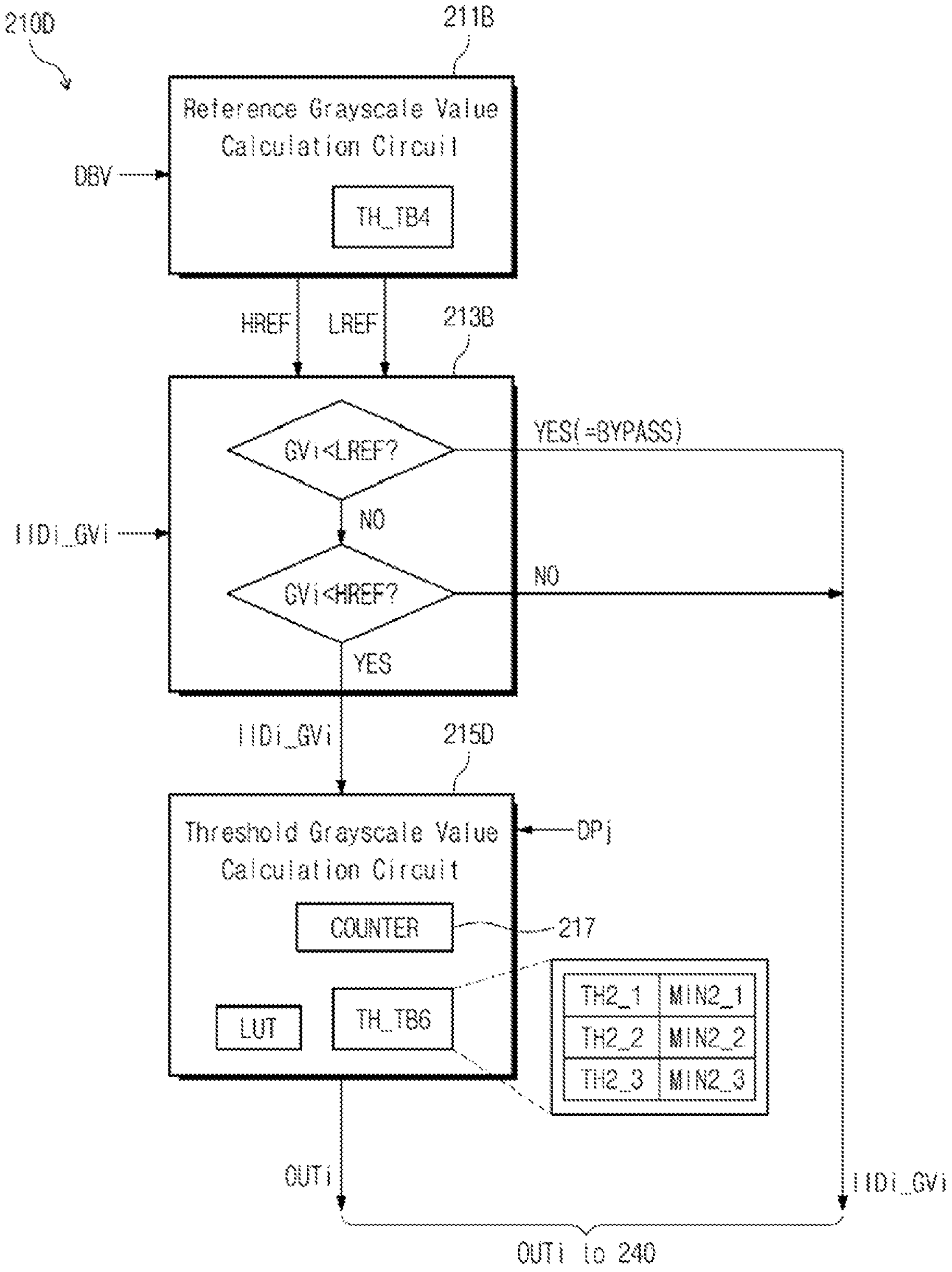
FIG. 9 is a block diagram illustrating an example embodiment of a dithering circuit illustrated in FIG. 1.

FIG. 9 is a block diagram illustrating an example embodiment of a dithering circuit illustrated in FIG. 1, and FIG. 10 is a diagram illustrating an example embodiment of a relationship between a count value and a threshold grayscale value for the purpose of describing an operation of a threshold grayscale value calculation circuit illustrated in FIG. 9.

Referring to FIG. 9, a dithering circuit 210D may include the reference grayscale value calculation circuit 2111B, the comparing circuit 213B, and a threshold grayscale value calculation circuit 215D. The dithering circuit 210D of FIG. 9 is an example of the dithering circuit 210 illustrated in FIG. 1.

Structures and operations of the reference grayscale value calculation circuit 211B and the comparing circuit 213B of FIG. 9 are the same as those of the reference grayscale value calculation circuit 211B and the comparing circuit 213B previously described in connection with FIG. 7.

The threshold grayscale value calculation circuit 215D includes the counter 217, and a memory device that stores sixth information TH_TB6 including a second group of threshold grayscale values TH21, TH2_2, and TH2_3 and a second group of minimum grayscale values MIN2_1, MIN2_2, and MIN2_3.

For example, the threshold grayscale value calculation circuit 215D may calculate the minimum grayscale value MIN2_2 for a second count value CNT2 using a fourth graph GRP4 defined depending on the minimum grayscale value MIN2_1 for a first count value CNT1 and the minimum grayscale value MIN2_3 for a third count value CNT3.

Referring to FIGS. 4, 9, and 10, the threshold grayscale value calculation circuit 215D generates the count value CNT as a result of counting the number of first data elements included in each of the dither patterns DP1, DP3, and DP4 using the counter 217, selects one of the second group of threshold grayscale levels TH2_1, TH2_2, and TH2_3 using the count value CNT, and select one of the second group of minimum grayscale values MIN2_1, MIN2_2, and MIN2_3 using the count value CNT.

When the first grayscale value GV1 is greater than the second reference grayscale value LREF and is smaller than the first reference grayscale value HREF, the threshold grayscale value calculation circuit 215D obtains the first dither pattern DP1 corresponding to the first grayscale value GV1 from the memory device 230 and generates the count value CNT by counting the number of first data elements included in the first dither pattern DP1.

The threshold grayscale value calculation circuit 215D calculates the sixth threshold grayscale value TH2_3 corresponding to the count value CNT (e.g., CNT3) associated with the number of first data elements included in the first dither pattern DP1, generates the first output image data OUT1 having the sixth threshold grayscale value TH2_3, and outputs the first output image data OUT1 to the data line driver 240.

When the third grayscale value GV3 is greater than the second reference grayscale value LREF and is smaller than the first reference grayscale value HREF, the threshold grayscale value calculation circuit 215D obtains the third dither pattern DP3 corresponding to the third grayscale value GV3 from the memory device 230 and generates the count value CNT (e.g., CNT1) by counting the number of first data elements included in the third dither pattern DP3.

The threshold grayscale value calculation circuit 215D calculates the fourth threshold grayscale value TH2_1 corresponding to the count value CNT (e.g., CNT1) associated with the number of first data elements included in the third dither pattern DP3, generates the third output image data OUT3 having the fourth threshold grayscale value TH2_1, and outputs the third output image data OUT3 to the data line driver 240.

When the fourth grayscale value GV4 is greater than the second reference grayscale value LREF and is smaller than the first reference grayscale value HREF, the threshold grayscale value calculation circuit 215D obtains the fourth dither pattern DP4 corresponding to the fourth grayscale value GV4 from the memory device 230 and generates the count value CNT (e.g., CNT2) by counting the number of first data elements included in the fourth dither pattern DP4.

As the second data element DE4 (=0) associated with the fourth grayscale value GV4 is selected, the threshold grayscale value calculation circuit 215D calculates the minimum grayscale value MIN2_2 corresponding to the count value CNT (e.g., CNT2) associated with the number of first data elements included in the fourth dither pattern DP4, generates the fourth output image data OUT4 having the minimum grayscale value MIN2_2, and outputs the fourth output image data OUT4 to the data line driver 240.

Referring to FIG. 10 and example (b) in the lower portion of FIG. 4, the grayscale value THa of the first output image data OUT1 is the sixth threshold grayscale value TH2_3, the grayscale value THc of the third output image data OUT3 is the fourth threshold grayscale value TH2_1, and the grayscale value THd of the fourth output image data OUT4 is the minimum grayscale value MIN2_2.

Figure 11:
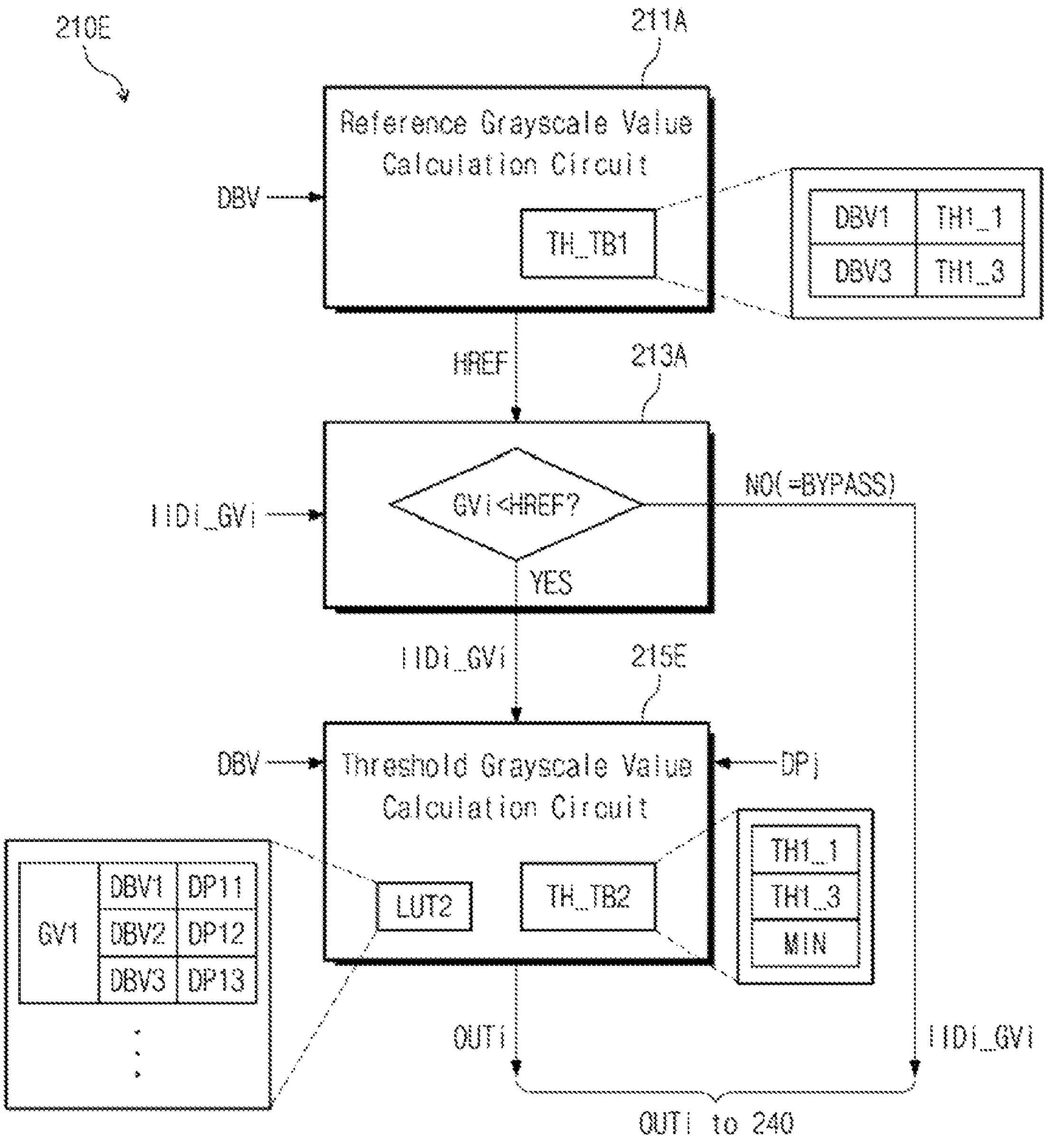
FIG. 11 is a block diagram indicating an embodiment of a dithering circuit illustrated in FIG. 1.

FIG. 11 is a block diagram illustrating an example embodiment of a dithering circuit illustrated in FIG. 1.

Referring to FIG. 11, a dithering circuit 210E may include the reference grayscale value calculation circuit 211A, the comparing circuit 213A, and a threshold grayscale value calculation circuit 215E. The dithering circuit 210E of FIG. 11 is an example of the dithering circuit 210 illustrated in FIG. 1.

Structures and operations of the reference grayscale value calculation circuit 211A and the comparing circuit 213A of FIG. 11 are the same as those of the reference grayscale value calculation circuit 211A and the comparing circuit 213A previously described in connection with FIG. 2.

The threshold grayscale value calculation circuit 215E receives the display brightness values DBV and the first input image data IID1 having the first grayscale value GV1 provided from the comparing circuit 213A, and obtains the dither pattern DPj corresponding to the first grayscale value GV1 for each brightness with reference to a lookup table LUT2 stored therein.

When a grayscale value is the first grayscale value GV1 and the display brightness value DBV is the first brightness value DBV1, the threshold grayscale value calculation circuit 215E obtains an eleventh dither pattern DPu (u=11) from the memory device 230 with reference to the lookup table LUT2.

When the grayscale value is the first grayscale value GV1 and the display brightness value DBV is the second brightness value DBV2, the threshold grayscale value calculation circuit 215E obtains a twelfth dither pattern DPu (u=12) from the memory device 230 with reference to the lookup table LUT2.

When the grayscale value is the first grayscale value GV1 and the display brightness value DBV is the third brightness value DBV3, the threshold grayscale value calculation circuit 215E obtains a thirteenth dither pattern DPu (u=13) from the memory device 230 with reference to the lookup table LUT2.

As the corresponding dither pattern DP11, DP12, or DP13 is selected, the threshold grayscale value calculation circuit 215E selects one of the threshold grayscale values TH1_1, TH1_3, and MIN included in the second information TH_TB2, generates the first output image data OUT1 having the selected threshold grayscale value TH1_1, TH1_3, or MIN, and outputs the first output image data OUT1 to the data line driver 240. The corresponding dither pattern DP11, DP12, or DP13 is provided as an example for convenience of description.

According to various example embodiments, the threshold grayscale value calculation circuit 215B, 215C, or 215D illustrated in FIG. 5, 7, or 9 may be replaced with the threshold grayscale value calculation circuit 215E of FIG. 11.

Figure 12:
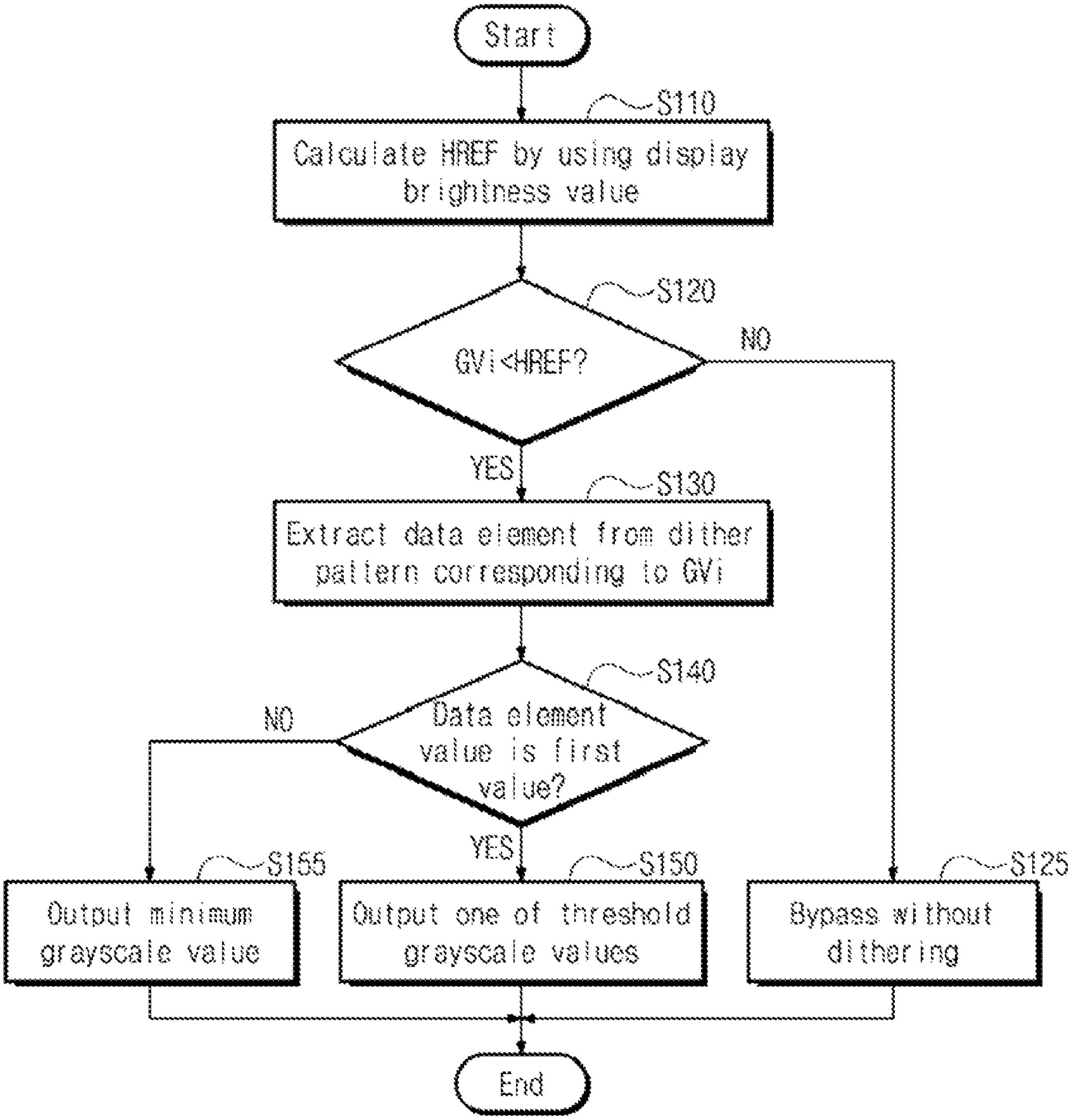
FIG. 12 is a flowchart describing an operation of a dithering circuit according to an example embodiment.

FIG. 12 is a flowchart describing an operation of a dithering circuit according to an example embodiment.

Referring to FIGS. 1 to 12, the dithering circuit 210 (210A to 210E being collectively referred to as "210") of the display driver IC 200 receives the brightness value DBV2 of the display 300 and calculates the first reference grayscale value HREF corresponding to the brightness value DBV2 using the first group of threshold grayscale values TH1_1 and TH1_3 (e.g., through the interpolation of the first group of threshold grayscale values TH1_1 and TH1_3) (S110).

The dithering circuit 210 receives the first input image data IID1 having the first grayscale value GV1 and compares the first grayscale value GV1 and the first reference grayscale value HREF (S120). When the first grayscale value GV1 is equal to greater than the first reference grayscale value HREF, the dithering circuit 210 bypasses the first input image data IID1 having the first grayscale value GV1 to the data line driver 240 without dithering the first input image data IID1 (S125).

When the first grayscale value GV1 is smaller than the first reference grayscale value HREF, the dithering circuit 210 obtains the first dither pattern DP1 corresponding to the first grayscale value GV1 from the memory device 230 and extracts a data element matched with the first grayscale value GV1 from among four data elements included in the first dither pattern DP1 (S130).

When the extracted data element is the first data element (YES in S140), the dithering circuit 210 selects one of the first group of threshold grayscale values TH1_1 and TH1_3 as an output grayscale value, and outputs the first output image data OUT1 having the output grayscale value to the data line driver 240 (S150).

However, when the extracted data element is the second data element (NO in S140), the dithering circuit 210 selects the minimum grayscale value MIN as an output grayscale value, and outputs the first output image data OUT1 having the output grayscale value to the data line driver 240 (S155).

Figure 13:
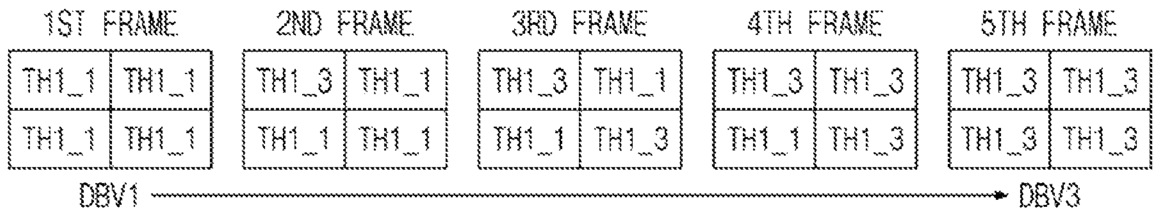
FIG. 13 is a diagram for describing an operation of a dithering circuit when a brightness value changes from a first display brightness value to a third display brightness value, according to an example embodiment.

FIG. 13 is a diagram for describing an operation of a dithering circuit when a brightness value changes from a first display brightness value to a third display brightness value, according to an example embodiment.

Referring to FIG. 13, when a brightness value of the display 300 changes from the first brightness value DBV1 to the third brightness value DBV3, a viewer that views the display 300 may experience various threshold grayscale values during a 5-frame time.

Referring to FIG. 3 as an example, when the brightness value of the display 300 is the first brightness value DBV1, an output grayscale value of the output image data is the first threshold grayscale value TH1_1; when the brightness value of the display 300 is the third brightness value DBV3, the output grayscale value of the output image data is the third threshold grayscale value TH1_3.

It is assumed that 2*2 input image data (i.e., a processing unit PU) have the same grayscale values, and a data element matched with the grayscale value of each input image data in a dither pattern corresponding to the grayscale value of each input image data is the first data element. Also, it is assumed that the first threshold grayscale value TH1_1 in the 8-bit-depth image is 17, and the third threshold grayscale value TH1_3 in the 8-bit-depth image is 16.

In a first frame 1ST FRAME, because an output grayscale value of each of 2*2 output image data corresponding to the 2*2 input image data is 17, the grayscale value of the 2*2 output image data corresponding to the processing unit is 17.

In a second frame 2ND FRAME, because an output grayscale value of each of three output image data of the 2*2 output image data is 17 and an output grayscale value of one output image data is 16, the grayscale value of the 2*2 output image data corresponding to the processing unit is 16.75.

In a third frame 3RD FRAME, because an output grayscale value of each of two output image data of the 2*2 output image data is 17 and an output grayscale value of each of two output image data is 16, the grayscale value of the 2*2 output image data corresponding to the processing unit is 16.50.

In a fourth frame 4TH FRAME, because an output grayscale value of one output image data of the 2*2 output image data is 17 and an output grayscale value of each of three output image data is 16, the grayscale value of the 2*2 output image data corresponding to the processing unit is 16.25.

In a fifth frame 5TH FRAME, because an output grayscale value of each of the 2*2 output image data is 16, the grayscale value of the 2*2 output image data corresponding to the processing unit is 16.00.

When the brightness value of the display 300 changes from the first brightness value DBV1 to the third brightness value DBV3, a grayscale value of the processing unit may be more finely expressed between 16 and 17 by the dithering circuit 210 according to an example embodiment. That is, with regard to the processing unit, grayscale values smaller than "1" may be expressed.

By way of summation and review, in an organic light emitting display device, images may be expressed based on the light emitted from organic light emitting diodes. Each organic light emitting diode may emit light based on a recombination of electrons and holes in an emission layer. The amount of light thus emitted may change depending on the amount of current flowing to an organic light emitting diode. When a low-grayscale image is displayed in the organic light emitting display device, it may be difficult to finely adjust a current for driving each organic light emitting diode, which may result in a Mura in the low-grayscale image. A dithering algorithm may be used to improve, e.g., reduce, the Mura of the low-grayscale image.

As described above, embodiments may provide a display driver integrated circuit (IC) including a dithering circuit capable of adaptively changing a threshold grayscale value depending on a display brightness value for the purpose of removing or improving Mura that occurs in a low-grayscale image, a device including the same, and a method thereof.

According to an embodiment, a display driver IC, a device including the same, and a dithering method may remove or improve the Mura appearing in a low-grayscale image by adaptively changing a threshold grayscale value depending on a display brightness value.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display driver integrated circuit (IC) for a display, comprising:

a data line driver configured to drive data lines connected with a first processing unit comprising a plurality of pixels; and a dithering circuit configured to receive a brightness value of the display, to calculate a first reference grayscale value corresponding to the brightness value using a first group of threshold grayscale values, to receive input image data with a first grayscale value, and to generate output image data having an output grayscale value based on the first reference grayscale value and the first grayscale value.

2. The display IC as claimed in claim 1, wherein the dithering circuit selects one of the first group of threshold grayscale values as the output grayscale value.

3. The display IC as claimed in claim 1, wherein the dithering circuit includes a memory device configured to store the first group of threshold grayscale values.

4. The display driver IC as claimed in claim 1, wherein the first group of threshold grayscale values includes a mapping table including:

a first threshold grayscale value corresponding to a first brightness value; and a second threshold grayscale value corresponding to a second brightness value.

5. The display driver IC as claimed in claim 4, wherein the dithering circuit includes a reference grayscale value calculation circuit configured to calculate the first reference grayscale value.

6. The display driver IC as claimed in claim 5, wherein the reference grayscale value calculation circuit calculates the first reference grayscale value by performing an interpolation between the first threshold grayscale value and the second threshold grayscale value.

7. The display driver IC as claimed in claim 6, wherein the interpolation includes a linear interpolation.

8. The display driver IC as claimed in claim 1, wherein the dithering circuit is further configured to:

calculate a second reference grayscale value corresponding to the first brightness value using a first group of minimum grayscale values; and generate the output image data further based on the second reference grayscale value.

9. The display driver IC as claimed in claim 8, wherein the dithering circuit selects one value from among the first group of threshold grayscale values and the first group of minimum grayscale values as the output grayscale value.

10. The display driver IC as claimed in claim 8, wherein the dithering circuit includes a memory device configured to store the first group of threshold grayscale values and the first group of minimum grayscale values.

11. The display driver IC as claimed in claim 8, wherein the first group of threshold grayscale values includes a mapping table including:

a first threshold grayscale value corresponding to a first brightness value;

a first minimum grayscale value corresponding to the first brightness value;

a second threshold grayscale value corresponding to a second brightness value; and a second minimum grayscale value corresponding to the second brightness value.

12. The display driver IC as claimed in claim 11, wherein the dithering circuit includes a reference grayscale value calculation circuit configured to calculate the first reference grayscale value and the second reference grayscale value.

13. The display driver IC as claimed in claim 12, wherein the reference grayscale value calculation circuit calculates the first reference grayscale value by performing a first interpolation between the first threshold grayscale value and the second threshold grayscale value, and calculates the second reference grayscale value by performing a second interpolation between the first minimum grayscale value and the second minimum grayscale value.

14. The display driver IC as claimed in claim 13, wherein at least one of the first interpolation and the second interpolation includes a linear interpolation.

15. A display device, comprising:

a display including a first data line connected with a first pixel; and a display driver IC configured to drive the first data line, wherein the display driver IC includes:

a data line driver configured to drive the first data line in response to output image data;

a reference grayscale value calculation circuit configured to receive a brightness value of the display, and to calculate a first reference grayscale value corresponding to the brightness value using a first group of threshold grayscale values; and a threshold grayscale value change circuit configured to receive input image data with a first grayscale value, which corresponds to the first pixel and to generate the output image data having an output grayscale value based on the first grayscale value and the first reference grayscale value.

16. The display device as claimed in claim 15, wherein the reference grayscale value calculation circuit includes a memory device which stores the first group of threshold grayscale values.

17. The display device as claimed in claim 15, wherein:

the reference grayscale value calculation circuit is further configured to calculate a second reference grayscale value corresponding to the brightness value using a first group of minimum grayscale values, and the threshold grayscale value change circuit generates the output image data further based on the second reference grayscale value.

18. The display device as claimed in claim 15, wherein:

the first group of threshold grayscales value grayscale values includes a first threshold grayscale value corresponding to a first brightness value, and a second threshold grayscale value corresponding to a second brightness value, and the reference grayscale value calculation circuit calculates the first reference grayscale value by performing an interpolation between the first threshold grayscale value and the second threshold grayscale value.

19. The display device as claimed in claim 18, wherein the interpolation includes a linear interpolation.

20. An operating method of a display driver IC, the method comprising:

receiving a brightness value of a display and calculating a first reference grayscale value corresponding to the brightness value using a first group of threshold grayscale values;

receiving input image data having a first grayscale value; and generating an output image data having an output grayscale value based on the first grayscale value and the first reference grayscale value.

* * * * *